US010259022B2

(12) United States Patent
Self

(10) Patent No.: US 10,259,022 B2
(45) Date of Patent: Apr. 16, 2019

(54) THERMOMECHANICAL DECONTAMINATION SYSTEM AND METHOD FOR INFECTIOUS WASTE TREATMENT

(71) Applicant: John R Self, Cullman, AL (US)

(72) Inventor: John R Self, Cullman, AL (US)

(73) Assignee: John R. Self, Cullman, AL (US)

( * ) Notice: Subject to any disclaimer, the term of this patent is extended or adjusted under 35 U.S.C. 154(b) by 344 days.

(21) Appl. No.: 15/221,886

(22) Filed: Jul. 28, 2016

(65) Prior Publication Data

US 2017/0028451 A1 Feb. 2, 2017

Related U.S. Application Data

(63) Continuation of application No. PCT/US2015/014903, filed on Feb. 6, 2015.

(60) Provisional application No. 61/937,304, filed on Feb. 7, 2014.

(51) Int. Cl.

| B30B 11/24 | (2006.01) |
| B09B 3/00 | (2006.01) |
| B02C 19/22 | (2006.01) |
| B02C 19/00 | (2006.01) |
| B02C 25/00 | (2006.01) |

(52) U.S. Cl.
CPC ........ *B09B 3/0075* (2013.01); *B02C 19/0075* (2013.01); *B02C 19/22* (2013.01); *B02C 25/00* (2013.01); *B09B 3/0083* (2013.01); *B30B 11/24* (2013.01); *B30B 11/243* (2013.01); *B30B 11/246* (2013.01)

(58) Field of Classification Search
CPC ..... B30B 11/24; B30B 11/241; B30B 11/243; B30B 11/245; B30B 11/246; B30B 11/248; B09B 3/0075; B09B 3/0083; B29C 47/40; B29C 47/62; B29C 45/0001; B29B 17/02; B29B 13/10; B29B 9/06; C08K 3/34; B29K 2067/00; B61L 11/00

USPC .......................................................... 100/146

See application file for complete search history.

(56) References Cited

U.S. PATENT DOCUMENTS

| 4,599,002 | A | * | 7/1986 | Gutknecht | ................ B30B 9/12 |
| | | | | | 264/211.23 |
| 5,429,489 | A | * | 7/1995 | Geyer | ....................... B29B 7/46 |
| | | | | | 366/84 |
| 5,603,564 | A | * | 2/1997 | Zimmermann | ..... B29C 47/0847 |
| | | | | | 366/77 |
| 5,799,883 | A | * | 9/1998 | Lewis | ..................... A61L 11/00 |
| | | | | | 241/21 |

(Continued)

FOREIGN PATENT DOCUMENTS

| WO | WO 9531319 A1 * | 11/1995 | ............... B29B 9/06 |
| WO | WO 2012003507 A1 * | 1/2012 | ............... A61L 11/00 |

*Primary Examiner* — Jimmy T Nguyen
(74) *Attorney, Agent, or Firm* — Mattingly & Malur, PC

(57) ABSTRACT

An infectious waste treatment system and method for decontaminating infectious waste employ a thermal friction extruder in which first and second interleaved counter-rotatable augers include reverse pitch flight sections that urge waste material in a direction opposite to that of the flow stream and into engagement with the back sides of friction plates. This increases the amount of heat generated by the extruder. The reverse pitch flight sections can be selectively replaced with forward pitch flight sections to control the amount of heat imparted to the waste material by the friction plates.

10 Claims, 2 Drawing Sheets

(56) References Cited

U.S. PATENT DOCUMENTS

2010/0237289 A1* 9/2010 Self .................. A61L 11/00
252/373

* cited by examiner

THERMOMECHANICAL DECONTAMINATION SYSTEM AND METHOD FOR INFECTIOUS WASTE TREATMENT

TECHNICAL FIELD

The present invention relates generally to the field of decontamination of waste. In particular, the present invention is directed to a system and method for the thermomechanical decontamination and volume reduction of infectious waste materials such as medical waste using internal friction as the decontamination agent.

BACKGROUND ART

In the decontamination of infectious waste, namely medical waste, it is important to insure that the ultimate waste product, which is to be discarded, is free of pathogenic microorganisms. It is also highly desirable, and in some instances required by law, to render infectious waste in a condition such that individual components, such as disposable syringes, bandages, body fluid receptacles, and even body parts removed in surgery or in autopsies, are unrecognizable.

Infectious waste such as medical waste is generated by hospitals, medical laboratories, and the like and is required to be decontaminated prior to being disposed. Examples of medical waste include hypodermic syringes, glassware, slides, gauze, needles, infectious tissues, blood-soaked materials, red bag waste, or other such potentially infected or contaminated medical waste materials typically generated during the normal operation of a hospital, medical laboratory, or the like. Public concern over the proper treatment and disposal of medical waste products has increased over the past several years. This increase is due in part to an increased public awareness of the diseases that can be transmitted by biologically contaminated waste products. It is therefore desirable to produce a disposal system which adequately disinfects infectious waste products while rendering the waste unrecognizable to the degree that it can be disposed of in an approved disposal facility and/or used as a fuel source without posing further infection threats due to contact with the post-treated residual waste.

The prior art has attempted to address the problem of disposing of medical waste by methods such as specialized and filling, incineration, steam autoclaving, chemical treatment, and/or radiation treatment. Environmental regulations have severely limited the use of incineration for infectious waste disposal due to the potential production of gaseous emissions that may contain high levels of toxic heavy metals, e.g. cadmium, chromium, lead, mercury, dioxins and furans generated by the plastics and metallic content derived from syringes, needles, and sharps included in the waste. In addition, incinerators are not fully satisfactory because they require regular servicing and cleaning.

Steam decontamination is another known method for treating medical waste. Steam decontamination is primary performed in steam autoclaves. Steam autoclaving is a thermal process in which the wastes are disinfected by exposure to high-temperature steam and pressure. The high temperature and good penetrability of steam effectively destroys the infectious agents. Since the waste is rendered disinfected, it can be directly landfilled. However, for steam autoclaving to be an effective treatment method, the steam must fully penetrate the waste to ensure that all infectious microorganisms are destroyed. Also, since autoclaved waste is neither mechanically destroyed nor significantly reduced in volume, it is still recognizable as medical waste and treated hypodermic needles still pose a stick threat.

Still another method is the chemical decontamination of infectious waste. Hospitals and other health care facilities have used chemical agents routinely for decades in the decontamination of infectious waste. As in steam autoclaving, chemical decontamination will not be effective unless there is adequate contact between the infectious waste and the chemical. In addition, the chemical should be maintained at a sufficient concentration and there should be sufficient exposure time between the waste and chemical to achieve proper levels of decontamination. There are several other disadvantages of using chemicals in the decontamination of infectious waste including potential occupational exposures of workers to chemical concentrations in the air and through skin contact; the possibility of toxic byproducts in the wastewater; chemical hazards involved with the use and storage of the chemicals; chemical residue in the treated waste; and offensive odors.

Still another method of disinfecting infectious wastes is to use radiation treatment. The radiation may be microwave frequencies, shortwave radiofrequencies, and the like. The radiation treatment suffers from several disadvantages. First, radiation treatment by itself will not render the waste unrecognizable. Second, radiation involving the use of microwaves is not suitable for treating chemotherapy wastes or human organs or body parts. Third, the infectious waste must have a significant moisture content to insure effective treatment with microwaves.

A more promising approach for decontaminating medical waste is to use a thermal friction extruder apparatus using friction generated by counter-rotating interleaved worm gear augers or screws to grind and heat the waste. The basic concept of using counter-rotating screws to impart heat-generating friction to a material is disclosed, for example, in U.S. Pat. No. 4,599,002, which issued on Jul. 8, 1986 (hereinafter, "the '002 patent"). This patent specifically discloses a screw extruder for compressing a material in which two interleaved counter rotating screw or auger members extend through a plurality of casing members, each separated by a corresponding one of a plurality of throttle plate members. The throttle plate members each has an orifice there through of a preselected dimension that is selected to effectively block the free-section of the screw members whereby, material to be compressed is pressed against the throttle plate member with a large force thereby causing heat that creates pulverization and drying of the material by friction on each of the throttle plate members. However, the '002 patent apparatus is not designed to decontaminate infectious waste and would not be able to generate enough heat to do so without some kind of modifications.

International Patent Application No. PCT/US2011/042905, which was published on Jan. 5, 2012 as International Publication Number WO 2012/003507 A1 (hereinafter, "the 507 application") discloses a system which employs a thermal friction extruder apparatus similar in construction to the extruder disclosed in the '002 patent, to decontaminate infections waste. To increase the amount of heat generated in the extruder, an adjustable outlet size extruder die is located at the terminal end of the apparatus for converting the ground medical waste into an extrudate and controlling the backpressure of the extrudate as it exits the extruder. The extruder die has an adjustable outlet valve piston disposed therein for controlling the size of and therefore the temperature of the extrudate. The extruder die can thus be employed arguably to impart enough heat to the waste that it will be decontaminated.

However, in practice, to insure that the amount of heat generated by the extruder is sufficient to raise the temperature of the waste high enough to disinfect the same, it has been found that the size of the extruder die has to be adjusted so small, that it becomes too difficult to move the material through the extruder die. In addition, the tremendous backpressure imparted to the material stream by the extruder die subjects the apparatus to excessive wear and tear.

SUMMARY OF INVENTION

The present invention is directed to a thermal friction extruder type infectious waste treatment system and method for the decontamination of infectious waste that overcomes the forgoing drawbacks of the apparatus disclosed in the '507 application.

More particularly, the thermal friction extruder used in the present invention is similar in construction to those disclosed in the '002 patent and '507 application with a particularly notable exception that reverse pitch auger sections are selectively employed to urge waste in a direction opposite to that of the flow stream and into contact with the back sides of one or more friction plates. The reverse pitch auger sections cause an increased amount of heat to be generated in the infectious waste without the need for a backpressure inducing extruder die at the discharge end of the extruder. As a result, the extruder can operate without excess stress being applied to the apparatus and without impeding the free flow of waste material through the extruder.

Preferably, the extruder includes multiple sections referred to as compression chambers that are separated from one another by a corresponding plurality of friction plates. As in the '002 patent and the '507 application, the friction plates are designed to form a small gap between the auger flight outer diameters and the friction plate inner diameters. This gap enables waste material to pass there through only once the waste has been reduced in size to the size of the gap. Each of the auger members includes small aggressively pitched auger sections that are positioned adjacent each friction plate on both sides thereof. The aggressive auger sections in the first chamber are positioned adjacent to the front side of the first friction plate and act to push the waste material into engagement with the friction plate front side. After the material passes through the gap between the first friction plate and the auger flights, the materiel engages a reverse pitch auger section which urges the waste material back in a direction opposite to that of the flow stream and into contact with the back side of the first friction plate. This causes further frictional heating of the waste material.

The foregoing process is repeated in a second and even additional compression chambers until the waste reaches a temperature where it is fully decontaminated. The use of a series of reversed pitch auger sections, which can be effectively added or subtracted by simply swapping the interleaved reverse pitch sections in the two counter-rotating augers, to produce more of less frictional heat thus enables control of the internal temperature of the friction extruder.

Another significant feature of the extruder is the provision of forward and reverse thrust bearings both positioned at the discharge end of the extruder to control and maintain the alignment of the extrusion augers;

The treated waste exiting the extruder enters an extended residence chamber composed of an enclosed belt conveyor with sufficient length and speed to convey the disinfected waste leaving the extruder for a period of at least 4 minutes residence time inside of the conveyor enclosure. The main purpose of the extended residence chamber is to allow verification of the disinfection of the waste to be demonstrated, by running through the process, microorganisms which are predetermined by state environmental agencies.

Temperature sensors are preferably positioned in both the extruder and the extended residence chamber. A process control unit coupled to the temperature sensors is provided for receiving temperature signals indicative of the temperature in the extruder housing and extended residence chamber. The process control unit controls the various elements of the system including an electric motor for rotating the extruder augers.

BRIEF DESCRIPTION OF THE DRAWINGS

The foregoing and other features and advantages of the present invention will become apparent from the following detailed description of a preferred embodiment thereof, taken in conjunction with the accompanying drawings, which are briefly described as follows.

BEST MODE FOR CARRYING OUT THE INVENTION

The previously discussed prior art references, U.S. Pat. No. 4,599,002, issued Jul. 8, 1986 and Published International Application No. WO 2012/003507, published on Jan. 5, 2012, are both hereby incorporated by reference in their entireties. In addition, the application on which this application claims priority, U.S. Provisional Application No. 61/937,304, filed Feb. 7, 2014, is also hereby incorporated by reference in its entirety.

As noted above, the present invention relates to a system and method for the thermomechanical treatment of infectious waste wherein the infectious waste is rendered decontaminated and unrecognizable using friction as the sole source of decontamination. "Infectious waste" shall generally be defined as any material that is capable of producing disease. The definition of infectious waste shall include but shall not be limited to medical waste wherein "medical waste" is defined as any solid waste generated in the diagnosis, treatment, or immunization of human beings or animals, in research pertaining thereto, or in the production or testing of biologicals, excluding hazardous waste identified or listed under 40 CFR Part 261 or any household waste as defined in 40 CFR Sub-section 261.4 (b) (1). "Decontamination" means either the substantial sterilization or disinfection of infectious waste. "Sterilization" means the removal or destruction of all microorganisms. "Disinfection" is a somewhat less lethal process than sterilization which destroys or inactivates viruses, fungi, and bacteria (but not necessarily their endospores) on inanimate surfaces. "Unrecognizable" means that the original appearance of the feed material has been altered such that neither the feed material nor its source can be identified. "Thermomechanical" means the combination of friction and mechanical deformation.

Figure 1:
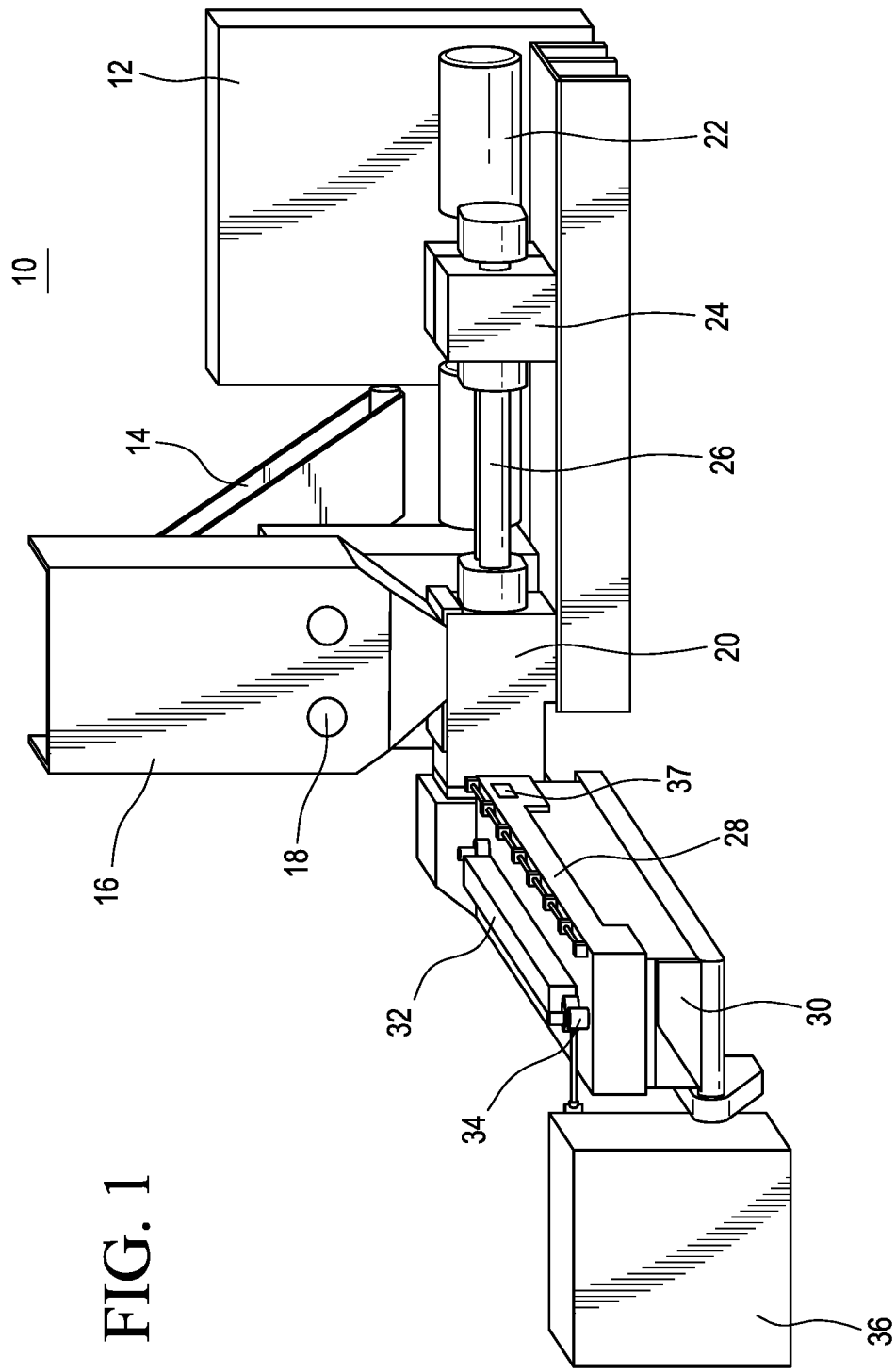
FIG. 1 is a schematic illustration of an infectious waste treatment system that is configured in accordance with a preferred embodiment of the present invention.

A decontamination system 10 which is configured in accordance with a preferred embodiment of the invention is shown in FIG. 1. The decontamination system 10 is designed to treat infectious waste that is introduced into the system whereby the waste will be decontaminated and rendered unrecognizable. The system 10 includes a process control unit 12 for controlling each of the various system components. The process control unit 12 may be a conventional, microprocessor-based process controller, a process logic controller, or similar process control system.

A feed conveyor 14 is provided which advances waste to be decontaminated into a feed hopper 16. Disposed in the feed hopper 16 is a mechanical blending or mixing device 18, such as a pair of counter rotating augers (not shown), which performs an initial separation of the waste. For example, in the case where the waste is fed into the conveyor 14 in bags, the blending device 18 can open the bags.

The separated waste is fed into a thermal friction extruder 20 which is the key component of the treatment system 10 and serves to thermomechanically decontaminate the waste and render the same unrecognizable. The extruder 20 is discussed in greater detail in conjunction with FIGS. 2 and 3. An electric motor 22, transmission 24 and drive shafts 26 provide and transmit power to rotate screw augers in the extruder 20.

After the waste passes through the extruder 20, the now decontaminated waste is passed through a heated and enclosed extended residence chamber 28. The chamber 28 includes a belt conveyor 30, a hot air circulation system 32 to heat the extended residence chamber, a steam exhaust vent 34, and a HEPA air filter and steam condensing combination system 36. The exhaust vent 34 can be located at the top and/or bottom of the extended residence chamber 28 and any steam or vapor flowing out during the extrusion process can be removed thereby and led to the filter/steam condensing system 36. The condensed steam or vapor from the system 36 will then enter into the site's liquid waste treatment process or other treatment device.

The main purpose of the extended residence chamber 28 is to allow verification of the disinfection of the waste to be demonstrated, by running through the process, microorganisms which are predetermined by state environmental agencies. These organisms must be recoverable in order to be lab tested for organism kill efficiency. If these organisms are introduced into the extruder 20 they would be unrecognizable for recovery and therefore must be introduced into the system post-extrusion. Heated chamber 28 does not further macerate the waste, but only holds and maintains the waste at extrusion temperatures for an additional extended period of time and allows for the insertion and recovery of the microorganism in the form of a spore test strip.

Figure 2:
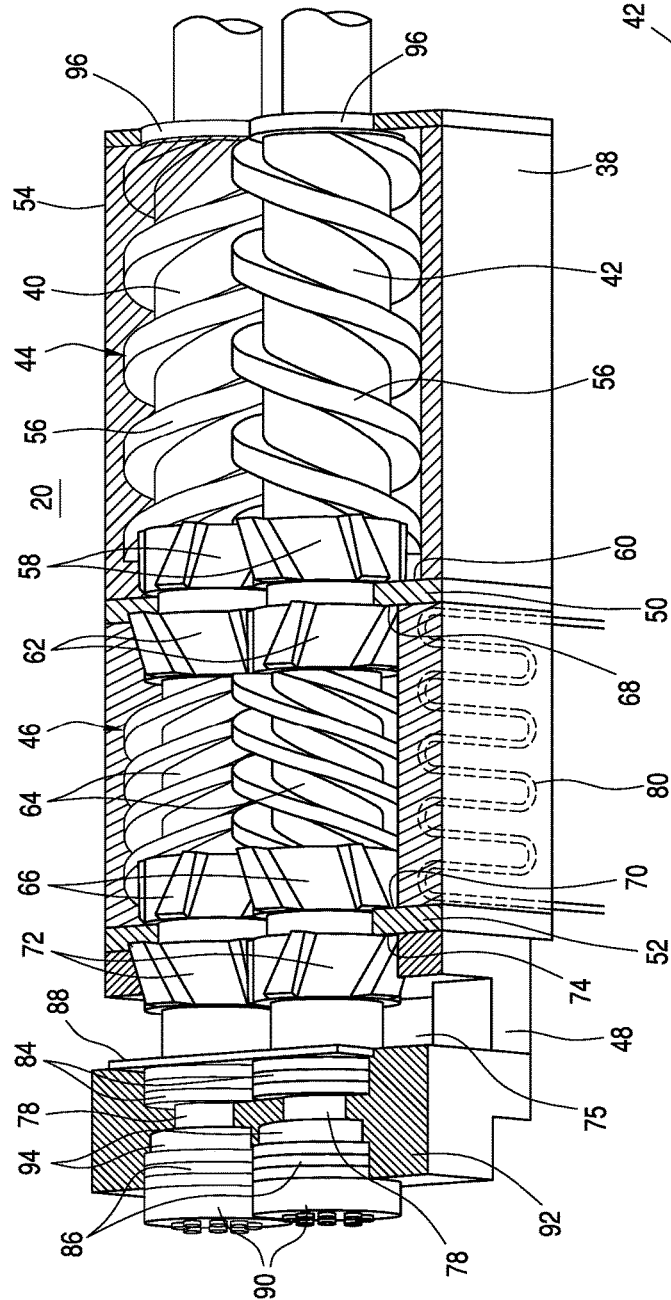
FIG. 2 is a cross sectional schematic of a preferred embodiment of a thermal friction extruder that is employed in the preferred embodiment of the invention.

With reference to FIG. 2, a sectional view of the thermal friction extruder 20 is illustrated which shows the various internal elements of the same that are disposed in an extruder housing 38, which is shown partially cut-away in FIG. 2. The extruder 20 includes first and second interleaved counter-rotatable augers 40 and 42, each of which extends through first and second compression chambers 44 and 46; and then terminate in a thrust bearing assembly housing 48. It should be noted, however, that the extruder 20 may include any number of compression chambers. The number of compression chambers can be adapted to the material to be processed.

Figure 3:
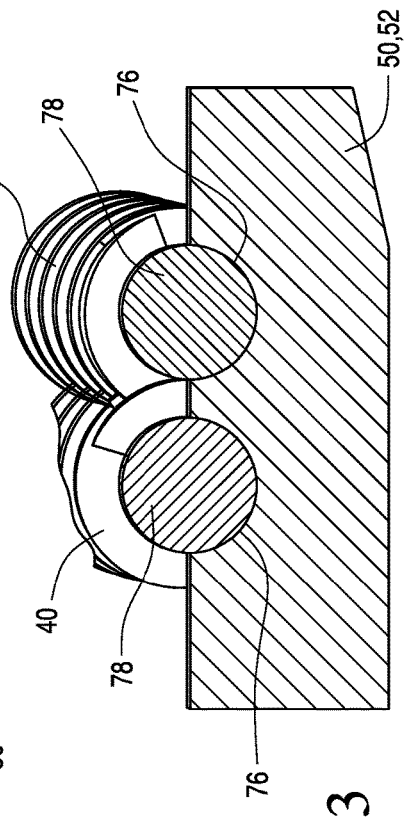
FIG. 3 is a cross section of the extruder's auger roots as they pass through a friction plate.

The first and second compression chambers 44 and 46 are separated from one another by a first friction plate 50, while the second compression chamber 46 and the thrust bearing assembly housing 48 are separated by a second friction plate 52. Waste to be decontaminated that is received from the feed hopper 16 enters an inlet end 54 of the extruder 20 in the first compression chamber 44. Disposed in the first compression chamber 44 are first and second pairs of flight sections 56 and 58 of each the augers 40 and 42, with the second sections 58 preferably being aggressive 4" section of flights which grind and force the waste into a front side 60 of the first friction plate 50. Eventually, the waste is ground down enough that it fits through a gap formed between the friction plate and the flights of the augers 40 and 42 as illustrated in FIG. 3, which is discussed in greater detail below.

The second compression chamber 46 contains first, second and third flight sections 62, 64 and 66 of each of the augers 40 and 42. The first flight sections 62 are positioned adjacent to the back side 68 of the first friction plate 50. As illustrated, the flights of first section 62 are reverse direction pitch flights, which force the waste back against the back side 68 of the first friction plate 50, thus increasing the thermomechanical heat being developed. The flights of the first flight sections 62 are designed with flight pitches shallow enough to create backpressure toward the back side 68 of the first friction plate 50, but are not aggressive enough to stop downstream movement of the waste material. The preferred flight pitch of auger sections 62 is 15° to 35°.

The second and third flight sections 64 and 66 in the second compression chamber 46 include forward or downstream direction flights that move the waste toward the second friction plate 52. As with the second flight sections 58 in the first compression chamber 44, each of the third flight sections 66 includes an aggressive 4" section of flights which grinds and forces the waste into and eventually under a front side 70 of the second friction plate 52. The thrust bearing assembly housing 48 contains a pair of final flight sections 72 which are positioned adjacent to the back side 74 of the second friction plate 52. As with the flight sections 62, the flights of final flight sections 72 are also reverse pitch direction flights, which again force the waste back against the back side 74 of the second friction plate 52, thus further increasing the thermomechanical heat being developed, as with fight sections 62, the flights of the final flight sections 72 are designed with flight pitches shallow enough to create backpressure toward the back side 74 of the second friction plate 52, but are not aggressive enough to stop downstream movement of the waste material. The preferred flight pitch of auger sections 72 is 15° to 35°.

Both of the pairs of auger flight sections 62 and 72 that are shown with reverse direction flights are preferably designed to be reversible so that the flights also can be positioned in the downstream direction if desired. Since the interleaved counter-rotating augers 40 and 42 inherently have auger sections which are of opposite pitch to one another as shown, the direction of the flights in the reverse pitch sections 62 can easily be reversed by simply swapping the section 62 on the first auger 40 with the section 62 on the second auger 42. This versatility enables the temperature of the waste material in the extruder 20 to be more precisely controlled, especially in the case where two or more compression chambers and corresponding friction plates are employed. In this regard, one or more temperature sensors (not shown) are preferably disposed in the extruder housing 38.

After the now decontaminated waste passes through the final reverse direction flight sections 72, the waste is discharged through an outlet 75 and deposited onto the conveyor 30 of the extended residence chamber 28 shown in FIG. 1.

A preferred embodiment of the auger root and friction plate arrangement is shown in FIG. 3. A gap (not visible in the drawing) is formed in the interface 76 between the outside diameter of the auger root 78 and the inside diameter of each of the friction plates 50 and 52. This gap 76 is selected to be big enough to allow grinded and crushed waste to pass through but small enough so that unground waste will not pass through. In this regard, the gap size should be no bigger than 5 millimeters although 2 millimeters provides the best results.

The extruder 20 heats, compresses, mixes, grinds, and crushes the infectious waste as the waste moves there through. The resulting final product is a decontaminated material that is unrecognizable and is suitable for disposal in a land-fill. Depending on the operating conditions of the extrusion process, the final product may be substantially homogeneous in a briquette form or homogeneous fluff wherein the final product has been compressed to about an 8 to 1 ratio in relation to the infectious waste that is inserted in the feed hopper 16. The amount of the thermomechanical heat is controlled in particular by the rotational speed of the extruder auger members 40 and 42 and the orientation of the reversible auger flight sections 62 and 72.

Preferably, all of the thermal energy required to decontaminate the infectious waste is introduced by the extruder 20 in the form of mechanical energy. However, there may be situations where an external heat source 80 is needed for a continuous operation, upon start-up of the extruder 20, or to accommodate a special type of infectious waste. The external heat source 80 is shown as being a resistance heating coil embedded in the extruder housing 38, but inductive heating, combustion heating, or other like sources of heat input can be employed as well. The external heat source 80 has two purposes: first, to preheat the extruder before cycling material there-through to eliminate insufficient start up heat; and second, to decontaminate compression chambers before working on them.

Returning to FIG. 2, the roots 78 of the first and second augers 40 and 42 are each rotatably mounted at their distal ends in first and second pairs of thrust bearings 84 and 86. The two pairs of thrust bearings are facing in opposite directions on the end of each of the augers 40 and 42. Each of the thrust bearings 84 sets against a shoulder 88 on the augers and each of the other thrust bearings 86 sets against a thrust cap 90 bolted to the end of each auger 40 and 42. Both pairs of thrust bearings 84 and 86 work against a collar 92 between them which can also carry a regular sleeve type bearing 94 for handling side loads. A second pair of sleeve bearings 96 is also located at the front end of the first compression chamber 44. The collar 92 is part of the thrust bearing assembly housing 48 that is fastened to the second compression chamber 46. This locates the augers 40 and 42 in the linear direction so that thrust upstream is eliminated.

The addition of a close proximity two directional thrust bearing has many benefits to this application. The augers 40 and 42 are designed to rotate in either direction creating a resulting linear thrust in opposite directions. In the prior art device disclosed in the '002 patent, for example, the thrust bearings are on opposite ends of the auger shaft and the transmission. The heat generated by the machine creates thermal expansion of the drive line and makes it very difficult to keep proper preload on the bearings. The prior art design in the '002 patent uses metal cone spring washers to help control the expansion. Reducing the distance between the bearings as in the present invention all but eliminates the issue. Also it takes much of the strain out of the frame and the transmission which have been carrying this pressure. The location of the double bearing at the exit end of the extruder 20 is also the most accessible place to service this critical bearing.

In operation of the decontamination system 10, infectious waste is moved by the conveyor 14 into the feed hopper 16. The infectious waste that is placed in the feed hopper 16 generally has been placed into a disposable container or bag for convenient handling of the waste. In the case of medical waste, the waste may be placed in what is known as a red bag. A level sensor (not shown) is preferably incorporated into the first feed hopper 16 and will activate the infectious waste treatment system 10 when the feed hopper 16 has been filled to capacity. Once the system 10 is activated, the feed mixer 18 will begin operation and will tear open the containers and/or bags containing the infectious waste and may dewater the waste depending on the type of feed mixer 18 that is utilized.

After the infectious waste has passed through the feed mixer 18, the waste will then pass into the first compression chamber 44 of the extruder 20, which also begins operation when the feed mixer 18 is activated. The extruder augers 40 and 42 will then begin rotating at a pre-set rpm level. The thermomechanical disinfection process begins in the first compression chamber 44. The counter rotating augers 40 and 42 grind and begin to homogenize the waste. At the same time, the waste is forced downstream into the more aggressive auger sections 58. Here the waste is forced against the front side 60 of the first friction plate 50 until it is small enough to pass through the gap under the first friction plate 50. Once past the first friction plate, the waste encounters the auger sections 62 which have reverse direction flights, and force the waste back against the opposite, back side 68 of the first friction plate 50, thus increasing the thermomechanical heat being developed.

The waste stream is further homogenized and volume reduced inside of the second compression chamber 46 where the same process in the first combustion chamber 44 is repeated and the waste receives additional thermomechanical heat and volume reduction. This process will ensure that all material passing through the extruder 20 will be decontaminated. The internal thermal sensors connected to the process control unit 12 measure the internal temperatures of the extruder 20.

The pre-set temperature is preferably over 205° F., more preferably 250° F., and most preferably over 300° F. Reversing one or both of the normally reverse pitch auger sections 62 and 72 controls the process temperature. Reversing these flight sections is a simple matter of swapping the right and left hand flight sections. Which side of the auger shaft these flights are mounted determines the direction of the auger flights.

The level sensor will indicate when the feed hopper 16 is empty or about empty and will begin the shut-down mode at which time the infectious waste treatment system 10 will no longer operate at steady state. When the hopper 16 is empty or about empty, the system will go into shutdown mode.

In the preferred embodiment, the process control unit 12 regulates the operation of the entire infectious waste treatment system 10. The process control unit 12 responds to signals from the various temperature sensors and regulates the operation of the extruder 20 and the extended residence chamber 28. A schematic depiction of a representative temperature sensor on the extended residence chamber 28 is shown at 37 in FIG. 1. The process control unit 12 can also control the speed of rotation of the augers 40 and 42 by the regulation of the speed of the motor 22. Further, the process control unit 12 received a signal from an electrical current sensor attached to the extruder motor 22 so that the motor 22 can be reversed before stalling out in case of a blockage inside of the extruder 20. The process control unit 12 also monitors the start-up and shut-down of the infectious waste system 10 by way of monitoring the feed hopper level sensor and receiving a signal from the level sensor.

Although the invention has been disclosed in terms of a preferred embodiment and variations thereon, it will be understood that numerous other variations and modifications could be made thereto without departing from the scope of the invention as set forth in the following claims.

The invention claimed is:

1. A thermal friction extruder for use in an infectious waste treatment system comprising:
   (i) a housing defining a material flow passage, said housing having an upstream end and a downstream end;
   (ii) first and second interleaved counter-rotatable augers disposed in said housing and passing through said flow passage from said upstream end to said downstream end; each of said augers having a root and a plurality of flight sections on said root, wherein said first auger has flights that are opposite in direction to the flights of said second auger;
   (iii) at least a first compression chamber for receiving infectious waste material at said upstream end portion of said housing;
   (iv) at least a first friction plate in said housing and defining a first end of said first compression chamber, said friction plate being positioned over said roots of said first and second augers between first forward pitch flight sections and first reverse pitch flight sections, said friction plate being configured to form a gap between said friction plate and said auger roots which causes waste material on a first side of said friction plate to be urged by said first forward pitch flights into said friction plate, thereby imparting frictional heat to said waste material, and wherein said reverse pitch flight sections are configured such that waste material will be urged in an upstream direction toward a second side of said friction plate but will not be prevented from traveling overall toward said downstream end of said housing;
   (v) an outlet for discharging treated waste from said extruder at said downstream end of said housing;
   (vii) at least one temperature sensor coupled to said housing for measuring temperature in said housing;
   (viii) a motor coupled to said first and second augers for rotating said first and second augers in opposite directions with respect to one another; and
   (ix) an extended residence chamber including;
      (a) an enclosed belt conveyer for receiving treated waste from said extruder outlet and conveying the same through said extended residence chamber, said conveyer being configured to convey the disinfected waste leaving the extruder for a period of at least 4 minutes residence time inside of the residence chamber;
      (b) a ventilation system for continuously circulating hot air around the waste on the conveyor;
      (c) means for heating and maintaining the air in the residence chamber to a temperature range between 325° F. and 350° F.;
      (d) a ventilation system for removing steam that builds up inside of the enclosed conveyer and passing the steam through a filter and into a vapor condenser; and
      (e) temperature sensors for making and transmitting temperature measurements to a process control unit.

2. The extruder of claim 1, wherein the flights of said reverse pitch sections are angled at between 15 and 35 degrees about a vertical axis toward said upstream end of said housing.

3. The extruder of claim 1, wherein a second first friction plate is disposed in said housing, said second friction plate defining a second end of said first compression chamber and being positioned over said roots of said first and second augers between second forward pitch flight sections and second reverse pitch flight sections, said second friction plate being configured to form a gap between said second friction plate and said auger roots which causes waste material on a first side of said second friction plate to be urged by said second forward pitch flights into said second friction plate, thereby imparting frictional heat to said waste material, and wherein said second reverse pitch flight sections are configured such that waste material will be urged in an upstream direction toward said second side of said second friction plate but will not be prevented from traveling overall toward said downstream end of said housing.

4. The extruder of claim 3, wherein said reverse pitch auger sections are removable and can be selectively replaced to become additional forward pitch auger sections to reduce the amount of heat imparted to the waste material in said chamber during operation.

5. The extruder of claim 1, wherein said motor has an adjustable speed to control the amount of frictional heat imparted to the waste material in the extruder during operation.

6. The extruder of claim 1, wherein a series of said compression chambers, friction plates and reverse pitch auger sections is provided.

7. The extruder of claim 6, wherein each of the reverse pitch flight sections is independently replaceable with a forward pitch flight section to facilitate more precise control of the heat imparted to the waste material in the compression chambers during operation.

8. The extruder of claim 1, wherein the reverse pitch auger sections of both auger members are removable and can be changed to forward pitch auger sections by swapping the augers on which said reverse pitch auger sections are mounted.

9. The extruder of claim 1, wherein said process control unit receives inputs from said temperature sensor and controlling operation of said motor in response thereto.

10. The extruder of claim 9, wherein said process control unit is also coupled to electrical current sensors attached to the motor and can be used to reverse the motor in case of a blockage inside of the extruder barrel.

* * * * *